United States Patent
Quinn et al.

(10) Patent No.: US 6,538,606 B2
(45) Date of Patent: Mar. 25, 2003

(54) ANTENNA MODULE INTERFACE EXTENSION

(75) Inventors: Liam B. Quinn, Austin, TX (US); Alan Eric Sicher, Austin, TX (US)

(73) Assignee: Dell Products L.P., Round Rock, TX (US)

(*) Notice: Subject to any disclaimer, the term of this patent is extended or adjusted under 35 U.S.C. 154(b) by 0 days.

(21) Appl. No.: 09/770,600

(22) Filed: Jan. 26, 2001

(65) Prior Publication Data

US 2002/0101378 A1 Aug. 1, 2002

(51) Int. Cl.$^7$ .................................................. H01Q 1/24
(52) U.S. Cl. ........................................ 343/702; 343/906
(58) Field of Search .............................. 343/702, 878, 343/879, 880, 893, 906

(56) References Cited

U.S. PATENT DOCUMENTS

| | | |
|---|---|---|
| 4,238,799 A | 12/1980 | Parfitt |
| 4,266,227 A | 5/1981 | Blaese |
| 5,138,328 A | 8/1992 | Zibrik et al. |
| 5,657,028 A * | 8/1997 | Sanad ................ 343/700 MS |
| 5,677,698 A | 10/1997 | Snowdon |
| 5,918,163 A * | 6/1999 | Rossi ........................ 455/90 |
| 6,011,519 A | 1/2000 | Sadler et al. |
| 6,118,773 A * | 9/2000 | Todd .......................... 370/334 |
| 6,259,409 B1 * | 7/2001 | Fulton et al. ................ 343/702 |
| 6,289,213 B1 * | 9/2001 | Flint et al. ................... 455/420 |
| 6,339,400 B1 | 1/2002 | Flint et al. |
| 6,342,858 B1 | 1/2002 | Dakeya et al. |
| 6,456,245 B1 * | 9/2002 | Crawford .................... 343/702 |

* cited by examiner

*Primary Examiner*—Don Wong
*Assistant Examiner*—Shih-Chao Chen
(74) *Attorney, Agent, or Firm*—Haynes and Boone, LLP

(57) ABSTRACT

A computer system that provides for an antenna port with a bay or door that receives a module containing an antenna. The antenna module contains an antenna or a set of antennas that support wireless communication technologies contained in the computer system. The antenna module is "standardized" and can be used for various computer systems employing the standard port with the bay or door. The antenna module may be developed and certified separate from the notebook system. In addition to the antennas, a diversity switch may be added, the diversity switch is used to choose the proper antenna for communication. A high gain amplifier and filters to compensate for RF signals may also be added to the module. A receiver, transmitter, or transceiver device may be added to the module or may be placed in the computer system. Placing the device on the module allows the transmission of digital signals, providing decreased signal loss along transmission lines. Power is provided to the module by a separate power line from the computer system.

20 Claims, 3 Drawing Sheets

WIRELESS COMMUNICATION TECHNOLOGY

| COMMUNICATION CATEGORY | COMMUNICATION TECHNOLOGY | OPERATING FREQUENCY |
|---|---|---|
| WWAN | GPRS | 900/1900 MHZ |
| | CDMA | 850/1900 MHZ |
| | TDMA | 850/1900 MHZ |
| | W-CDMA | 2.0 GHZ |
| WLAN | IEEE 802.11B | 2.4 GHZ |
| | IEEE 802.11A | 5.2 GHZ |
| WPAN | BLUETOOTH | 2.4 GHZ |
| | IEEE 802.15 | 2.4 GHZ |

ANTENNA MODULE INTERFACE EXTENSION

BACKGROUND OF THE INVENTION

1. Background

This disclosure relates to a computer system, and more particularly to a mobile computing system or platform using a removable antenna module containing an antenna to support wireless communication devices in the mobile computing system or platform.

2. Description of the Related Art

Mobile personal computers (PC), also known as "laptops" and "notebooks" (notebook), typically provide wireless communications by the use of what are commonly known as PC cards defined by the Personal Computer Memory Card International Association (PCMCIA). In typical applications, a PC card used for wireless communication will use an antenna interface to establish a wireless connection to a remote terminal or access point. A wireless communication PC card can have a built-in radio modem and an antenna. In certain configurations, the antenna protrudes out of the PC card. These integrated antennas are designed exclusively for wireless technology used by that particular PC card.

Manufacturers in order to provide cost effective and seamless end user wireless communication capabilities have found advantages in integrating wireless technologies into the architecture of a notebook system. Instead of relying on a PC card that is externally added via a card slot, the user can have wireless technology built into the notebook.

Wireless communications technologies continue to evolve and mature. Available wireless communication technologies that are now available to notebook systems include: wireless personal area networks (WPAN); wireless local area networks (WLAN); and wireless wide area networks (WWAN).

WPAN is an evolving area that includes an industry driven specification known as "Bluetooth," which is used as the basis for Institute of Electrical and Electronics Engineers (IEEE) standard 802.15.1. WPAN standards are specifically targeted as cable replacement wireless technologies for a range of diverse computing devices such as PCs, Personal Digital Assistants (PDAs), peripherals, cell phones, pagers, and consumer electronics. WPAN allows these enabled devices to communicate and operate with one another over a short range.

WLAN allows communication to a local network such as an Ethernet network within a building or locally on a campus or public "hotspot" areas such as hotels or airports. The IEEE standard 802.11 addresses this type of wireless communication technology.

WWAN generally refers to cellular and PCS telephone communication and covers code division multiple access (CDMA), time division multiple access (TDMA) and their variant standards. WWAN works over a longer distance and accommodates user mobility.

Wireless communication technologies can operate at varying frequencies and rely on antennas capable of transmitting and receiving at specific frequencies that support particular wireless communication technology.

Now referring to FIG. 1 illustrated is a chart of wireless communication technologies and their operating frequencies. Wireless communications can be grouped under communication category 10, further categorized as communication technology 15 and further defined by operating frequency band 20. In the industry WWAN 25 includes general packet radio service (GPRS) 40 that may operate at a switching frequency of 900/1800 megahertz (MHz) or 1900 Mhz; code division multiple access (CDMA) 45 that operates at 850/1900 MHz; time division multiple access (TDMA) 50 operating at 850/1900 MHz; and wideband CDMA (W-CDMA) 55 operating at 2.0 gigahertz (GHz). The WLAN 30 category includes IEEE standard 802.11b 60 operating at 2.4 GHz and IEEE 802.11a 65 operating at 5.2 GHz. In WPAN 35, Bluetooth 70 technology operates at 2.4 GHz. WPAN also includes the evolving IEEE standard 802.15 75 at 2.4 GHz. Since it is to be finalized, IEEE 802.15 75 potentially may operate at a different frequency in the future. Other technologies in the future may operate in other frequencies.

Antennas that support wireless communication technologies can be as diverse as the wireless technologies that they support. Antennas can come in varying shapes and sizes, including straight dipole antennas and patch antennas. Antennas are able to support a range of frequencies that support various technologies, however, one antenna or antenna system cannot support all of the wireless communication technologies that are expected to be integrated within a notebook system. A notebook manufacturer must therefore determine what antenna or antenna system to include to support whatever wireless communication technology is part of the notebook architecture. Since wireless communication is an evolving area, frequency and antenna requirements will also evolve and change over time.

Manufacturers have realized the need to provide wireless communication technologies and solutions into notebooks. To this end, antennas are often integrated into the chassis of notebooks or in the LCD panel of the notebook. The integrated antenna of the notebook is typically a custom design to the particular notebook platform.

Now referring to FIG. 2, illustrated is a connection of an integrated antenna to a notebook chassis. Antenna 200 is connected by a jumper wire 210 to a module 205. The module 205 can be placed on a mother board or a system board of the notebook system. A design consideration is to make the jumper wire 210 as short as possible. In other words, a connection of the antenna 200 to the module 205 should be as short as possible. Considering that analog radio frequency (RF) signals are transmitted along the connection, a shorter connection allows for a reduction of transmission noise, but more importantly transmission loss from the antenna. Integrating an antenna into a notebook system adds to design considerations; a manufacturer must be able to know or plan as to the size, shape and location of an antenna, and design the notebook architecture with that particular antenna in mind. Adding a jumper wire further adds to the design and manufacturing cost of the notebook.

An antenna may be part of a device that includes specific wireless communication technology such as transmitters, receivers and transceivers. Such a device is an integrated wireless device. Antennas and integrated wireless devices may be designed, integrated and certified along with a notebook. Changing an antenna or integrated wireless device for a different function or purpose can require a redesign or change to the notebook chassis which would can be a lengthy, expensive, or impractical design change.

If a different antenna to replace an existing integrated antenna is desired, a new notebook chassis intended for the new antenna must be created, the old chassis must be disassembled, the parts of the computer system integrated into the new assembly, and certification conducted on the new notebook package. Modular devices such as transceivers or radio devices may easily be replaced on a notebook computer architecture, but an antenna that is integrated into the chassis of a notebook presents a more complicated modification. To create different notebook chassis for a multitude of antennas in existence can be impractical. In certain cases, a notebook user may be in a situation where the wireless communication technology that is being used requires a change of wireless communication devices and an antenna to support the change. This may be the case when a user has a notebook designed for the United States WWAN market, and the user brings the notebook to Europe where there is a difference WWAN standard. The wireless communication system, including the antenna, built into the United States market notebook, is useless in Europe. A simple change of transceivers inside the system board may be all that is needed, however the user does not have the ability to replace the antenna. Antennas that are fixed or integrated into a notebook chassis do not allow for factory customization and limit flexibility to manufacturers that provide customization of notebook systems for their customers.

In the timeline of notebook development and product introduction to the marketplace, manufacturers very early on define the mechanical layout of the notebook design. A notebook's physical layout is designed and the location of its parts is determined. A specific location is provided for the processor. A specific location is provided for the memory. A specific location is provided for multi-media components. Currently no specific location, however, is provided for an antenna. Considering the varying physical shapes and sizes that an antenna may come in, it can be difficult to provide a predetermined location for an antenna in a notebook with limited space requirements.

A manufacturer can reserve a space in the notebook system architecture for the antenna. Because the antenna and the notebook are an integrated system, the system must be certified as a whole. This translates to the need to certify a new system each time a different antenna is introduced. The same notebook architecture will be certified as many times as a new antenna is introduced. In a competitive marketplace, manufacturers strive to bring new notebook designs to consumers as expeditiously as possible. Waiting for regulatory certification of various antennas added to a particular notebook architecture adds to the time before a notebook is delivered to the marketplace. A fixed or integrated antenna in a notebook becomes part of a larger communication systems design that must be certified. An antenna that is separated and treated independent from the system enables platform design independence.

A need has been felt for a modular antenna that is self contained and can be readily attached to a notebook or other computing device, where the notebook or computing device provides a designated interface or location to attach the modular antenna. The modular antenna should have the capability to be independently certified from the notebook or computing device architecture.

SUMMARY

In mobile computing systems such as notebooks which incorporate wireless technologies, an antenna system is needed. Oftentimes, the choice of an antenna or antennas is locked into the design of the computing system, with the antenna built into the chassis of the system. Modifications and changes to the antenna architecture are difficult if not impossible. To facilitate production of computing systems and to increase the flexibility of exchanging antennas, a modular design for an antenna in a mobile compute system is provided.

In one embodiment of the disclosure, the computer system provides for a bay or slot that readily accepts an antenna system. The antenna system is housed in a modular radome or casing unit that is "standardized" for the bay or slot. A door on the bay or slot encloses the modular unit into the computer system.

In an embodiment the modular unit contains one or more antennas. For multiple antennas a diversity switch is added to choose the proper antenna for transmission or reception. A high gain amplifier can be added to the module, where the high gain amplifier receives or transmits signals from and to the antennas. A RF cable is provided that connects to the computer system from the amplifier. RF analog signals are then passed to the computer system's receiver, or the computer systems transmitter passes RF signals to the module.

In an embodiment the receiver, transmitter, or a transceiver may be placed in the antenna module, so that analog RF signals are processed in the module and then transmitted to the computer system as digital base band signals. This allows for greater flexibility in placing the antenna module in the computing system.

In various embodiments of the disclosure, a microprocessor may be added to the antenna module where technical information regarding the antenna is provided to the computer system. Information may consists of the type and or capability of the antennas in the module.

BRIEF DESCRIPTION OF THE DRAWINGS

The present disclosure may be better understood, and its numerous objects, features and advantages made apparent to those skilled in the art by referencing the accompanying drawings. The use of the same reference number throughout the several figures designates a like or similar element.

Figures 1, 2:
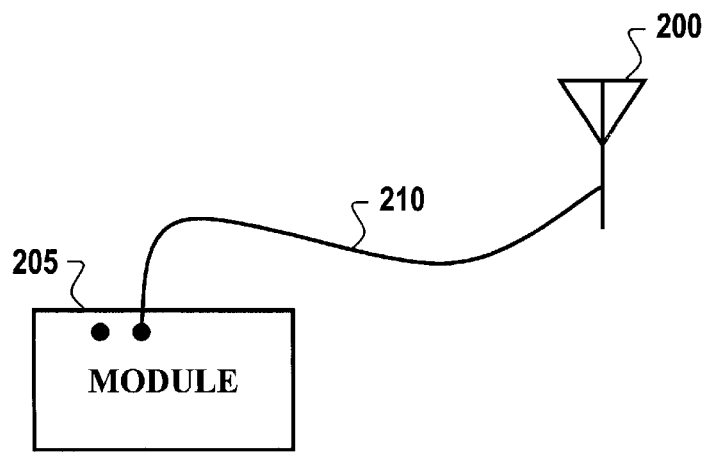
FIG. 1 illustrates wireless communication technology and related operating frequencies.
FIG. 2 illustrates a connection from a notebook antenna to a notebook system.

While the disclosure is susceptible to various modifications and alternative forms, specific embodiments thereof are shown by way of example in the drawings and will herein be described in detail, it should be understood, however, that the drawings and detailed description thereto are not intended to limit the invention to the particular form disclosed but on the contrary, the intention is to cover all modifications, equivalents, and alternatives falling within the spirit and scope of the present disclosure as defined by the appended claims.

Figure 3:
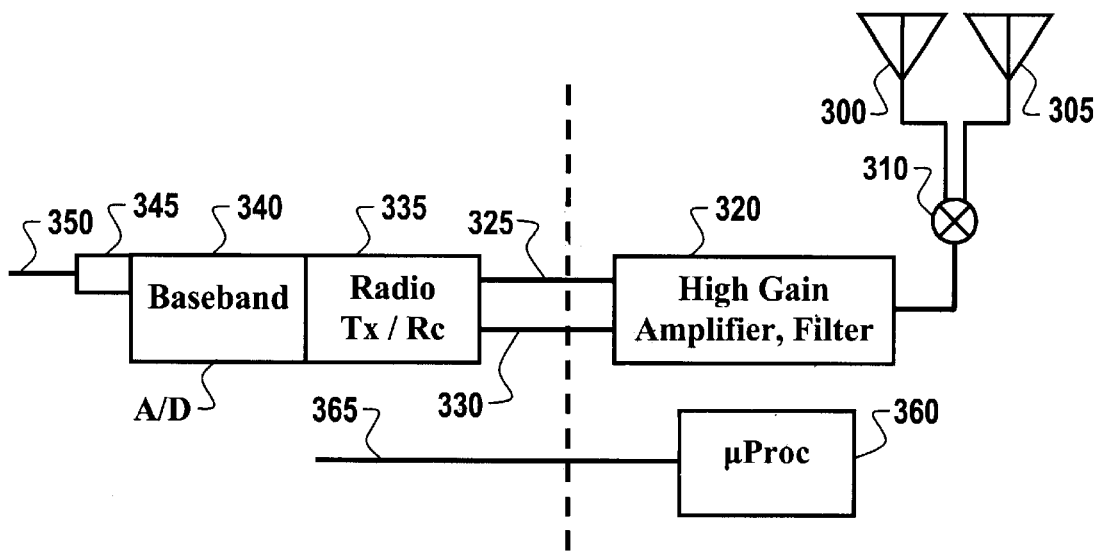
FIG. 3 illustrates an antenna system architecture that makes use of an antenna module.

Now referring to FIG. 3 illustrated is an antenna system architecture that makes use of an antenna module. Within the antenna module, an antenna or a series of antennas may be placed. These antennas can include antenna 300 and antenna 305. Additional antennas may be added or a single antenna may be used. Antenna 300, antenna 305, and other antennas of the antenna system are connected to a diversity switch 310. The purpose of diversity switch 310 is to choose the proper antenna for transmission and reception. The diversity switch can choose the antenna based on integrated software logic or a physical device such as a power sensor or zener diode. The power sensor or zener diode measures received or transmitted energy and based on that energy calculates the best antenna to receive or transmit. If a single antenna is incorporated no need will exist for the diversity switch 310. Received signals from the antenna system pass through a high gain amplifier 320. High gain amplifier 320 can also include low noise amplifier (LNA) when a signal is received. High gain amplifier 320 passes signals to a radio transmitter/receiver 335 by a wire 325. Information in the form of analog signals are passed between high gain amplifier 320 and radio transmitter/receiver 335. In this particular embodiment, the antenna module contains the antenna 300, the antenna 305, the diversity switch 310, and the high gain amplifier 320.

The radio transmitter/receiver 335 sends power to the high gain amplifier filter 320 through power line 330. The radio transmitter receiver 335 processes the analog signals into digital information and passes them on to a base-band processor 340. The base-band processor 340 passes on the digital signals to an interface 345. The interface 345 in turn passes on the digital signals to a bus 350 and to the computer system. Typically the digital signals will be passed on to the motherboard. Additional elements of the module can include a microprocessor 360. The microprocessor 360 passes on serial digital information regarding the condition or status of the module 360. This serial data is passed on to bus 365.

Figure 4:
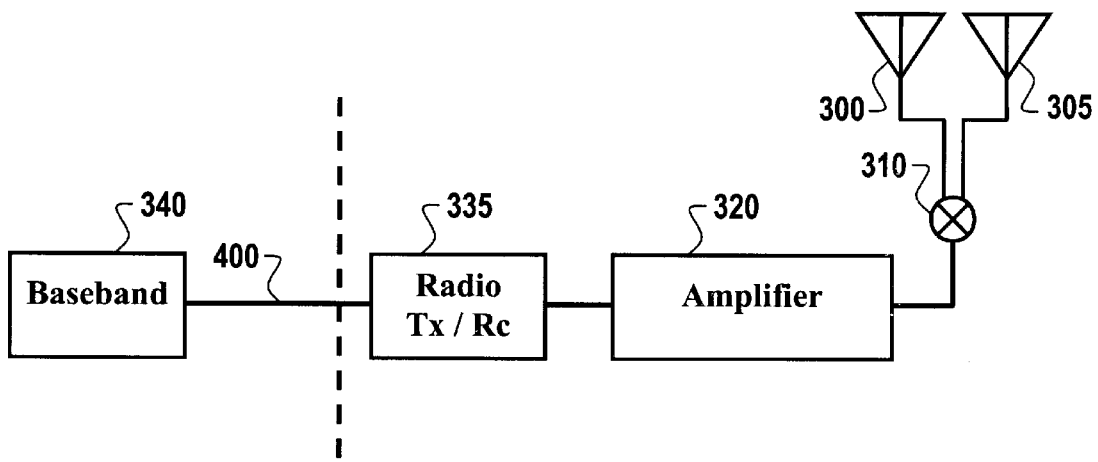
FIG. 4 is an antenna system architecture that passes digital information to a computer system.

Now referring to FIG. 4 illustrated is an antenna system architecture that passes digital signals to the system. The antenna system is set up to include antenna 300 and antenna 305. Other antennas may be added or a single antenna may exist. The antenna 300 and the antenna 305 are connected to the diversity switch 310. The diversity switch 310 determines the appropriate antenna to be used to transmit or receive the signal. Received signals are passed on the high gain amplifier 320. In this particular embodiment, the radio transmitter/receiver 335 is placed in the module. Because the radio transmitter/receiver 335 is placed into the module, digital information can be sent along a serial bus 400. This digital or serial information is sent to the base-band processor 340 located on the motherboard or a separate daughter card. Transmitting digital information allows for reduced line loss and noise, providing the capability for a longer line connection from an antenna module to the computer motherboard or system board.

Figure 5:
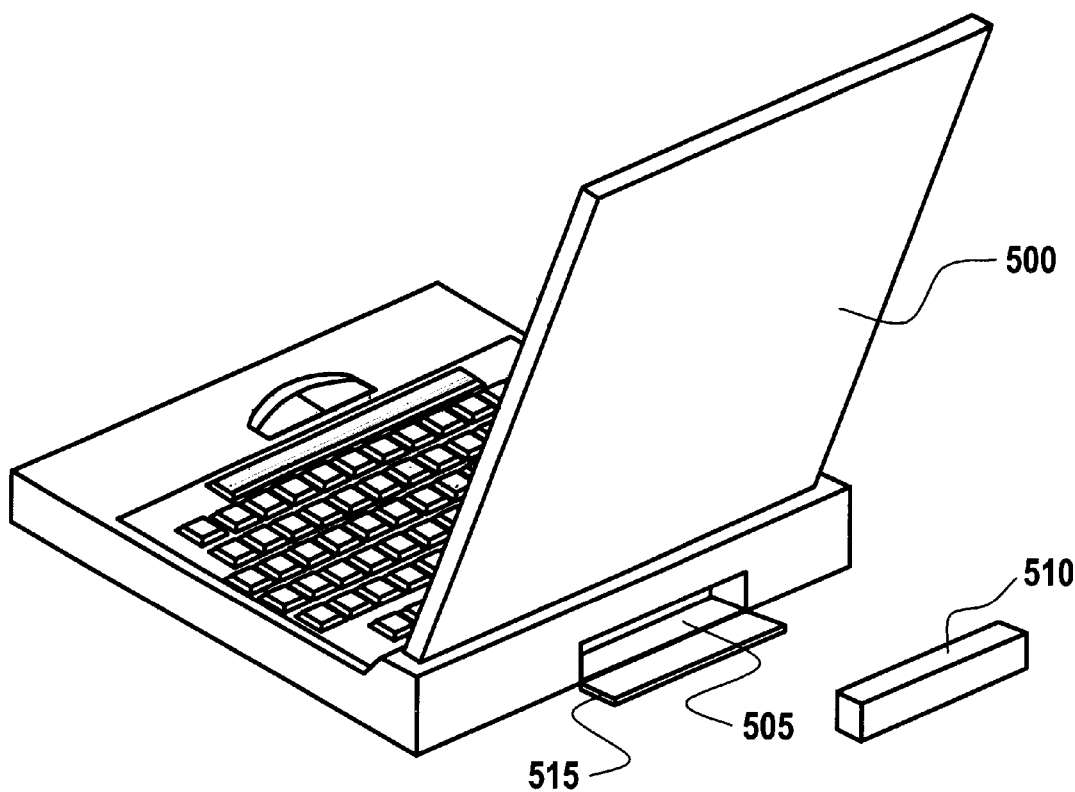
FIG. 5 illustrates a physical location in which an antenna can be placed.

Now referring to FIG. 5 illustrated is an embodiment of a physical location of a motherboard within which the antenna module can be placed into. Illustrated is a notebook 500 with a slot or bay 505. The slot or bay 505 accepts an antenna module 510. The slot or bay 505 can have a lid or door 515 that closes and locks in the antenna module 510. This particular embodiment illustrates the slot or bay 505 in the back of the notebook 500, however, various locations along the notebook 500 may have the slot or bay 505 and the lid or door 515. At times it may be desirable for the user to have access to the antenna module 510, and at other times it may be desired to limit access. Access to the antenna module 510 can be controlled by the manufacturer by the ease of opening or closing the door 515 and or placement of the slot or bay 505.

Figure 6:
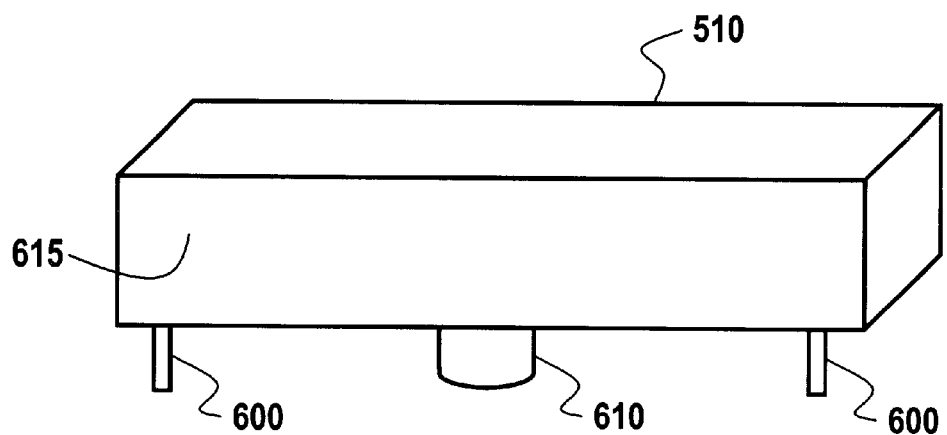
FIG. 6 illustrates the components of an antenna structure.

Now referring to FIG. 6 illustrated is the antenna module 510. In this particular embodiment antenna module 510 has connecting pins 600. Connecting pins 600 are used to mount the antenna module 510 into connecting holes or mounts found on the notebook. The connecting pins 600 provide structural connection to the notebook for the antenna module 510. A coaxial cable 610 for RF analog signals is provided. The antenna itself is housed in a plastic housing or radome 615. Module 510 should be large enough to accommodate a diverse range of sizes of antennas, including dipole antennas and patch-panel antennas. The expected size for these antennas depends on the frequency range and performance desired. Antenna module size will be determined by notebook size constraints and antenna size requirements that include the number of antennas that may be placed in the module.

Although the present disclosure has been described in connection with several embodiments, the disclosure is not intended to be limited to the specific forms set forth herein, but on the contrary, it is intended to cover such alternatives, modifications, and equivalents as can be reasonably included within the spirit and scope of the disclosure as defined by the appended claims.

What is claimed is:

1. A mobile computing system comprising:
    an antenna module having at least one antenna fixed within said antenna module; and
    a housing including:
        a slot capable of receiving said antenna module; and
        a door, wherein the door encloses the antenna module entirely within the housing, said antenna module remaining housed within said slot and enclosed by said door while in operation.

2. The mobile computing system of claim 1 wherein
    the slot comprises a set of mounting holes;
    the antenna module comprises a set of mounting pins whereby the set of mounting pins is connected to the set of mounting holes.

3. The mobile computing system of claim 1 wherein the antenna module comprises an RF connector, and the slot comprises an RF connector capable of accepting the RF connector of the antenna module.

4. The mobile computing system of claim 2 wherein the antenna module comprises an RF connector, and the slot comprises an RF connector capable of accepting the RF connector of the antenna module.

5. The mobile computing system of claim 1 wherein the antenna module further comprises a microprocessor that provides antenna module information to the computing system.

6. The mobile computing system of claim 5 wherein said antenna module information comprises information regarding characteristics of said at least one antenna.

7. The mobile computing system of claim 1 wherein the antenna module further comprises a radome enclosing said at least one antenna.

8. An antenna system in a mobile computing system comprising:
    an antenna module having a set of one or more antennas, said antenna module removable from said mobile computing system as a unit and entirely enclosed within a housing of said mobile computing system while in operation;
    a high gain amplifier within said antenna module connected to the set of antennas, whereby the high gain amplifier adjusts signal integrity;
    a radio device within said antenna module capable of transmitting and receiving analog signals, connected to the high gain amplifier; and
    a baseband device within said antenna module connected to the radio device; whereby the baseband device passes and receives digital signals from the radio device and passes information to and from the mobile computing system.

9. The antenna system of claim 8 wherein the set of antennas comprises a first antenna and a second antenna.

10. The antenna system of claim 9 wherein the antenna module comprises a power line to the mobile computing system.

11. The antenna system of claim 8 wherein the radio device transmits analog signals to said mobile computing system.

12. The antenna system of claim 11 wherein the module is sized to be enclosed within a bay of the mobile computing system during operation.

13. The antenna system of claim 8 further comprising a diversity switch capable of selecting an antenna from the set of antennas based on transmission or reception of the mobile computing system.

14. The antenna system of claim 8 wherein the module further comprises a microprocessor that provides antenna module information to the mobile computing system.

15. The antenna system of claim 14 wherein said antenna module information comprises information regarding characteristics of said set of antennas.

16. The antenna system of claim 15 wherein said antenna module information comprises serial digital information transmitted via a computer bus.

17. A portable computer comprising:

a computer housing;

a computer system located within said computer housing and including a bus;

a modular component comprising at least one antenna;

a bay in said computer housing adapted to receive said modular component;

a door coupled to said computer housing and adapted to enclose the modular component entirely within the computer housing; and said modular component enclosed within said bay during operation, and coupled to said bus.

18. The portable computer of claim 17, wherein the modular component further comprises a microprocessor that provides antenna information to the computer system.

19. The portable computer of claim 18, wherein said antenna information comprises information regarding characteristics of said at least one antenna.

20. The portable computer of claim 19, wherein said antenna information comprises serial digital information transmitted via said first computer bus.

* * * * *